United States Patent
Mahalingaiah et al.

(10) Patent No.: US 9,522,745 B2
(45) Date of Patent: Dec. 20, 2016

(54) METHOD AND SYSTEM FOR PREPARING AIRCRAFT MAINTENANCE APPLICATION DATA FOR PORTABLE DEVICES

(71) Applicant: HONEYWELL INTERNATIONAL INC., Morristown, NJ (US)

(72) Inventors: Pradeep Mahalingaiah, Karnataka (IN); Kannan Kathirvel, Tamil Nadu (IN); Michael Christensen, Mesa, AZ (US); Rupa Rudrappa, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/494,933

(22) Filed: Sep. 24, 2014

(65) Prior Publication Data

US 2016/0083118 A1    Mar. 24, 2016

(51) Int. Cl.
| | | |
|---|---|---|
| G06F 19/00 | (2011.01) | |
| B64F 5/00 | (2006.01) | |
| G07C 5/08 | (2006.01) | |
| G07C 5/00 | (2006.01) | |
| G06Q 10/06 | (2012.01) | |

(52) U.S. Cl.
CPC ............ *B64F 5/0045* (2013.01); *G06Q 10/06* (2013.01); *G07C 5/008* (2013.01); *G07C 5/0808* (2013.01); *G07C 5/0841* (2013.01)

(58) Field of Classification Search
CPC ...... B64F 5/0045; G07C 5/008; G07C 5/0808; G07C 5/0841
USPC .......................................................... 701/100
See application file for complete search history.

(56) References Cited

U.S. PATENT DOCUMENTS

| | | | | |
|---|---|---|---|---|
| 4,796,639 | A * | 1/1989 | Snow | G06F 19/3487 600/484 |
| 7,636,792 | B1 | 12/2009 | Ho | |
| 7,702,436 | B2 * | 4/2010 | Wingenter | G06Q 10/10 701/34.4 |
| 8,401,729 | B2 * | 3/2013 | Rouyre | B64F 5/0045 701/1 |
| 8,494,581 | B2 * | 7/2013 | Barbosa | G06Q 10/06 455/556.1 |
| 8,832,649 | B2 * | 9/2014 | Bishop | G06F 11/30 717/107 |
| 2003/0014692 | A1 * | 1/2003 | James | G05B 17/02 714/25 |
| 2004/0236723 | A1 * | 11/2004 | Reymond | G06F 19/345 |

(Continued)

FOREIGN PATENT DOCUMENTS

| | | |
|---|---|---|
| EP | 1455313 A1 | 9/2004 |
| EP | 2166778 A2 | 3/2010 |

OTHER PUBLICATIONS

EP Extended Search Report for Application EP 15186124.2 Dated Feb. 4, 2016.

*Primary Examiner* — Ian Jen
(74) *Attorney, Agent, or Firm* — Lorenz & Kopf, LLP

(57) ABSTRACT

Embodiments of the subject matter described herein relate generally to preparing aircraft maintenance application data for retrieval by portable devices. The method or system encompasses different components of the aircraft maintenance domain and meets the requirements of multiple stakeholders each seeking a customized record of aircraft maintenance application data. The method or system is also capable of expansion to support future requirements.

18 Claims, 3 Drawing Sheets

(56) References Cited

U.S. PATENT DOCUMENTS

| | | | |
|---|---|---|---|
| 2006/0025908 A1* | 2/2006 | Rachlin | G05B 23/0251 701/31.4 |
| 2006/0064291 A1* | 3/2006 | Pattipatti | G05B 23/0243 703/14 |
| 2009/0240390 A1* | 9/2009 | Nenadic | G05B 23/0251 701/29.1 |
| 2010/0082702 A1* | 4/2010 | Ramanathan | G07C 5/008 707/803 |
| 2010/0161169 A1* | 6/2010 | Ramanathan | G07C 5/008 701/31.4 |
| 2012/0198220 A1* | 8/2012 | Felke | G05B 23/0213 713/2 |
| 2012/0254876 A1* | 10/2012 | Bishop | G06F 9/542 718/102 |
| 2012/0304164 A1* | 11/2012 | van der Zweep | G06F 9/44505 717/174 |
| 2013/0097459 A1* | 4/2013 | Bell | G05B 23/0213 714/37 |
| 2014/0013002 A1 | 1/2014 | Holstein et al. | |
| 2014/0067694 A1* | 3/2014 | Moos | G06Q 10/20 705/305 |
| 2015/0019065 A1* | 1/2015 | Bollapragada | G07C 5/006 701/29.1 |

* cited by examiner

METHOD AND SYSTEM FOR PREPARING AIRCRAFT MAINTENANCE APPLICATION DATA FOR PORTABLE DEVICES

TECHNICAL FIELD

Embodiments of the subject matter described herein relate generally to methods for generating vehicle health maintenance data and, more particularly, to the preparation of aircraft maintenance application data for retrieval by portable devices.

BACKGROUND

Aircraft maintenance data typically results from monitoring and recording upward of eight thousand different aircraft parameters while an aircraft is in service. The aircraft maintenance data may be collected for individual parts, subsystems, or for entire systems, and is utilized by various applications for activities such as scheduling aircraft maintenance, providing insight into performance, and troubleshooting (prognostics). Often referred to as "vehicle health management," or an onboard maintenance system (OMS), the collection and recording of aircraft maintenance data is typically centrally managed by an onboard software program that compiles, sorts, and distributes the aircraft maintenance data for use by one or more stakeholders.

Interested avionics stakeholders, such as suppliers of parts, vehicle fleet operators, original equipment manufacturers (OEM), and military and research personnel, are increasingly switching to portable devices to reap the benefits of quick turnaround and customizability. Decreasing costs and increasing reliability has also driven the proliferation of portable devices into a wide range of applications in various segments of the aerospace domain. Many existing aircraft applications are being transferred from traditional centrally managed aircraft maintenance platforms to a plurality of portable devices, causing interface and efficiency issues with existing centralized hardware; in particular, traditional methods for delivering aircraft maintenance application data from the centralized hardware/software to a plurality of portable devices is inefficient.

Consequently, an innovative method or system capable of preparing aircraft maintenance application data for retrieval by portable devices is desired. The desired method or system encompasses different components of the aircraft maintenance domain and meets the requirements of the multiple stakeholders. In addition, the desired method or system is capable of expansion to support future requirements.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A method for preparing aircraft maintenance application data in an aircraft with onboard memory for retrieval via a portable device is provided. Raw aircraft maintenance data is collected and analyzed. Prognostic data that is consistent with the analyzed raw data is built and collated into a maintenance application data record.

A method for preparing for remote retrieval a maintenance application data record collected while an aircraft having onboard memory and a subsystem is in service is provided. Raw aircraft maintenance data is collected. A predictive pattern that indicates an issue with the aircraft subsystem is identified in the raw aircraft maintenance data. An error recover mechanism is created according to the identified predictive pattern. A prognostic data report for the aircraft subsystem is built. The maintenance application data record reflective of the prognostic data report and configured for remote retrieval by a first stakeholder is generated.

A system for preparing for remote retrieval a maintenance application data record collected while an aircraft having a subsystem is in service is provided. The system includes an onboard memory device and a processor. The processor is coupled to the memory device and configured to 1) collect raw aircraft maintenance data; 2) identify a predictive pattern in the raw aircraft maintenance data that is indicative of an issue with the subsystem; 3) generate an error recovery mechanism according to the predictive pattern; 4) build a prognostic data report for the subsystem; and 5) generate the maintenance application data record reflective of the prognostic data report and configured for remote retrieval by a first stakeholder.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

Figure 1:
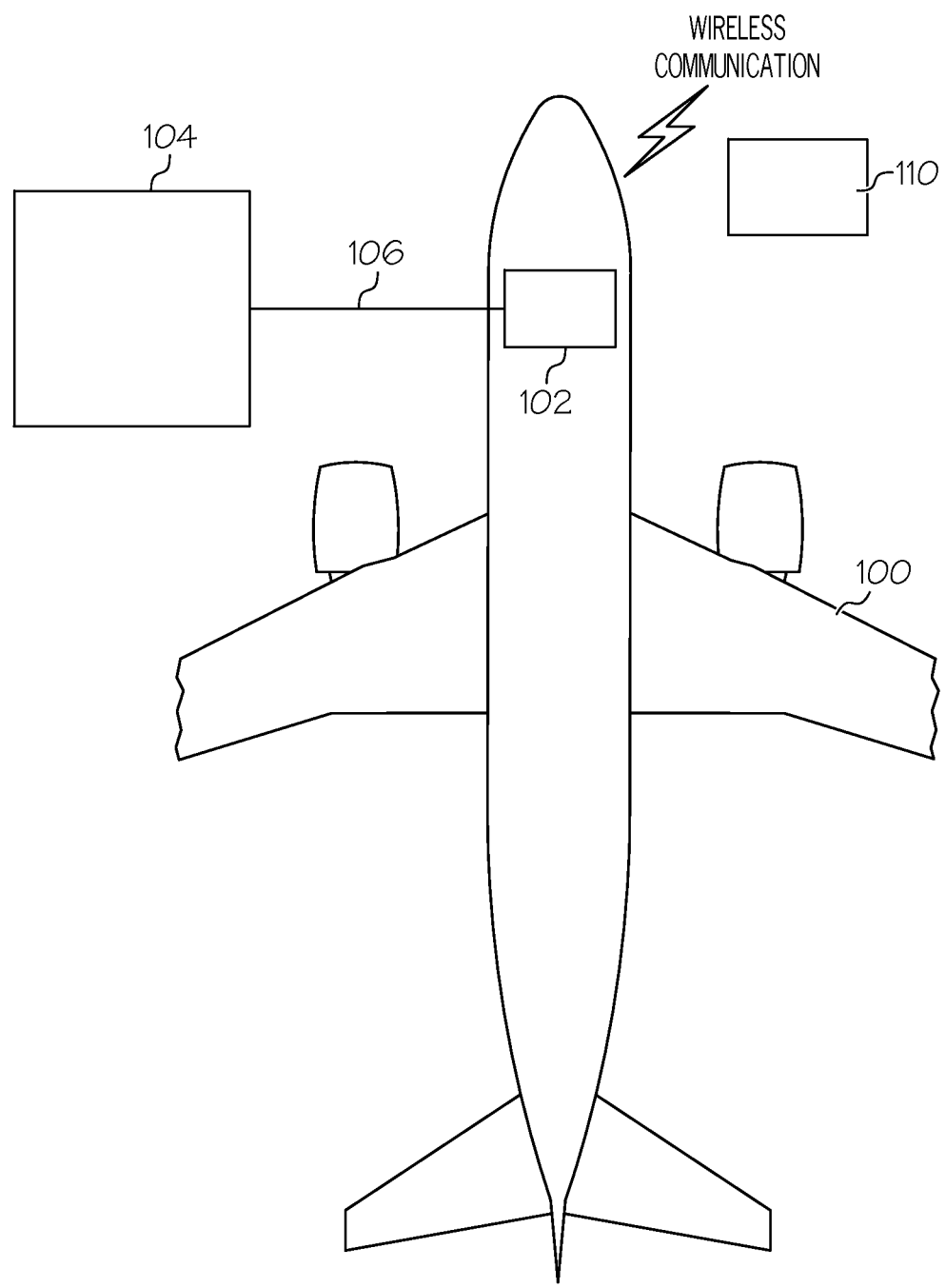
FIG. 1 is a simplified illustration of an aircraft, portable device, and ground base station arranged according to an exemplary embodiment.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to the transmittal of data, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment described herein is merely an example and serves as a guide for implementing the novel systems and method herein on any vehicle in any industrial, commercial, military, or consumer application. As such, the examples presented herein are intended as non-limiting.

FIG. 1 is a simplified illustration of an aircraft, a portable device, and a ground base station arranged according to an exemplary embodiment. Aircraft 100 includes a central maintenance computer 102. The central maintenance computer 102 is configurable to be coupled via a ground line 106 to the ground base station 104. The central maintenance computer 102 is also coupled to a portable device 110 via wireless communication. Portable devices typically communicate wirelessly, and include an onboard processor and memory. Often, a portable device also has an option to connect via a hard wire connection if the wireless signal is weak or causes a security concern. Portable devices vary in size, including examples such as, hand-held devices, devices contained in a backpack or brief case, and devices that sit on wheels or reside within a structure.

For simplifying purposes, only one portable device 110 and one ground base station 104 are shown in FIG. 1. In practice, there may be multiple portable devices and multiple ground base stations, in multiple locations. The ground base station 104 may be a maintenance terminal where ground base station tools are employed. Alternatively, ground base station 104 may be a remote device that has been coupled to the aircraft by way of ground line 106. As used herein, either ground base station 104 or portable device 110 may retrieve aircraft maintenance application data from the aircraft 100.

Each portable device 110 and each ground base station 104 is typically representative of a single stakeholder. A stakeholder includes airline, aircraft OEMs, suppliers of parts, vehicle fleet operators, military and research personnel, or similar interested parties. Each stakeholder may individually communicate with the aircraft, typically by utilizing a security protocol. Each stakeholder individually retrieves a customized maintenance application data record from the aircraft 100.

Wireless communication includes communication with portable devices such as portable device 110, as well as aircraft communications addressing and reporting system (ACARS), satellite, and similar means of wireless transmissions. Retrieval of maintenance application data records is typically done at the completion of aircraft flight operations, or at the end of aircraft service. Retrieval of records may be achieved via a ground line 106, or via wireless communication; wireless communication is supported at any time during aircraft service.

Figure 2:
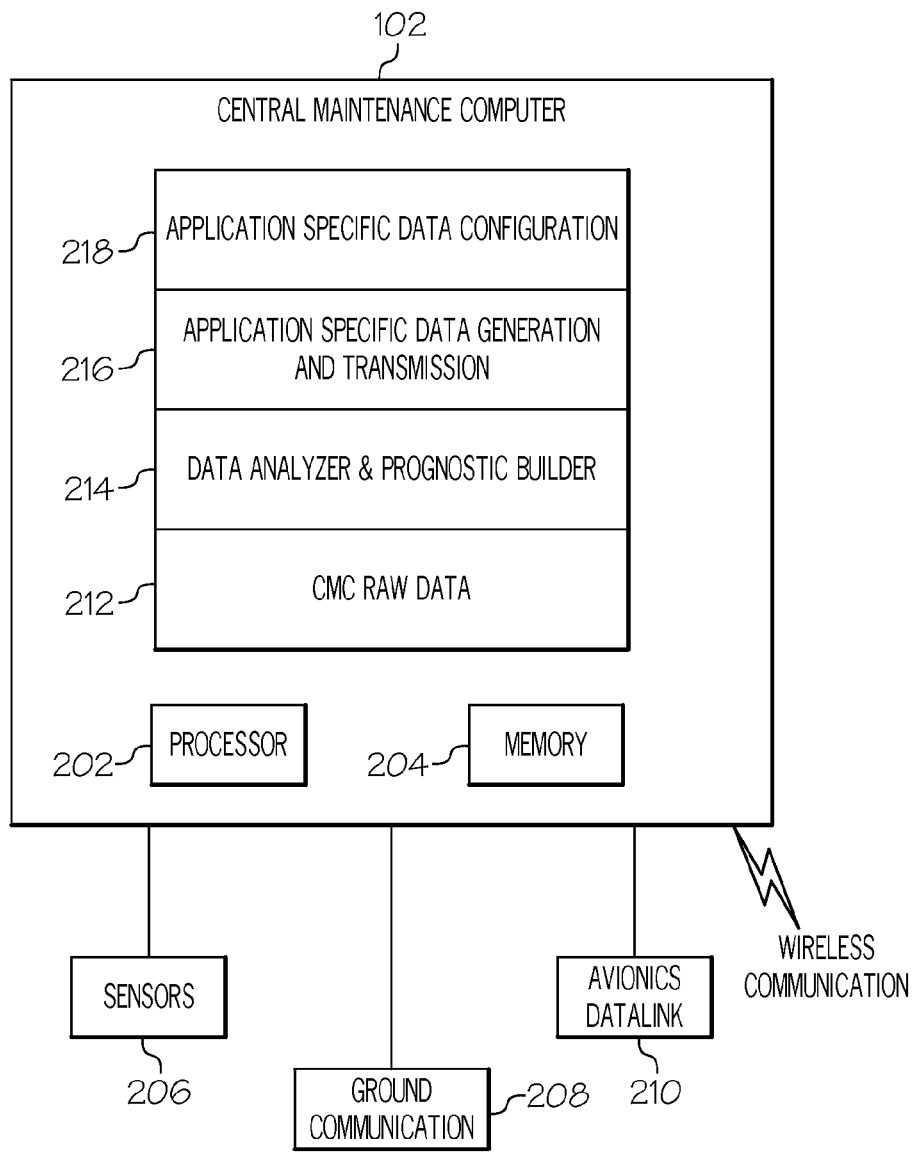
FIG. 2 is a system level block diagram of a central maintenance computer suitable for preparing aircraft maintenance application data for retrieval via a remote device, according to an exemplary embodiment.

FIG. 2 is a system level block diagram of the central maintenance computer 102 suitable for preparing aircraft maintenance application data for retrieval via a remote device, according to an exemplary embodiment. Central maintenance computer 102 includes processor 202 and memory 204. Sensors 206, ground communication 208, wireless communication, and avionics data link 210, each supply aircraft data and information to the central maintenance computer 102. As described in association with FIG. 1, communication of data and information between the aircraft and stakeholders external to the aircraft may be transmitted wirelessly or via a ground line; in some embodiments communication is also achieved via a CD, hard disk, USB stick, shop loader device, or similar device.

The processor 202 may be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The processor 202 may include or cooperate with an appropriate amount of memory (for example memory 204), which can be realized as RAM memory, flash memory, EPROM memory, EEPROM memory, registers, a hard disk, a removable disk, a CD-ROM, or any other form of storage medium known in the art. In this regard, the memory can be coupled to the processor such that the processor can read information from, and write information to, the memory. In the alternative, the memory may be integral to the processor. In practice, a functional or logical module/component of the system described here might be realized using program code that is maintained in the memory, or in separately located memory. Moreover, the memory can be used to store data utilized to support the operation of the system, as will become apparent from the following description.

In practice, the processor 202 may be realized as an onboard component of a vehicle (e.g., an onboard management system, central maintenance computer, a flight deck control system, a flight management system, or the like), or it may be realized in a portable computing device that is carried onboard the vehicle. For example, the processor 202 could be realized as the central processing unit (CPU) of a laptop computer, a tablet computer, or a handheld device. No matter how processor 202 is specifically implemented, it is in operable communication with one or more remote devices (for example, portable device 110 and ground base station 104 in FIG. 1) when an aircraft maintenance application record is retrieved by a stakeholder.

Sensors 206 include devices, instruments, and software for detecting status, temperature, faults, condition or any other aircraft subsystem or environmental data. The avionics data link 210 is a communication media having a bandwidth and sequencing protocol that allows transmission of data between electronic subsystems onboard the aircraft as well as aircraft to ground exchange of data.

The sensors 206, ground communication 208, avionics data link 210, and wireless communication may all contribute to the specification of or generation of raw data that will be stored in the central maintenance computer (CMC). Non-limiting examples of raw data include fault history data sets, maintenance reports, maintenance memos that have been entered by the pilot or crew, aircraft configuration data, and data/health dumps from various line replacement units (LRU). When the vehicle is in service, the embodiment concurrently collects and records, in the CMC, multivariant parametric data as raw data. The raw data forms the basis of the aircraft maintenance application data that is retrieved by stakeholders using portable devices.

The exemplary embodiment provides a framework for preparing aircraft maintenance application data for retrieval by portable devices in four layers, but the functionality may be supported by other arrangements as well. The functionality of the four layers of the exemplary embodiment is as follows. Raw data is copied from its resident location in the CMC to the first layer 212, the CMC raw data layer, where it is utilized by the other layers. In a second layer 214, the data analyzer and prognostic builder layer, the raw data from the first layer 212 is inspected and analyzed, and prognostics are developed for LRUs. In a third layer 216, the application specific data generation and transmission layer, data from the second layer 214 is collated and organized to generate maintenance application data records. In the fourth layer 218, the application specific data configuration layer, maintenance application data records generated in the third layer 216 are configured to meet stakeholder requirements. The fourth layer 218 can be tuned and designed based on one or more stakeholder's requirements. More detail regarding the operations that occur in each layer is provided in connection with FIG. 3.

In the exemplary embodiment, multiple customized maintenance application data records are generated concurrently. It is readily appreciated that various stakeholders may have some redundancy between them with respect to some or all of the maintenance application data records that they request. Any redundancy is readily handled by this embodiment, as it concurrently populates the associated maintenance application data records.

Figure 3:
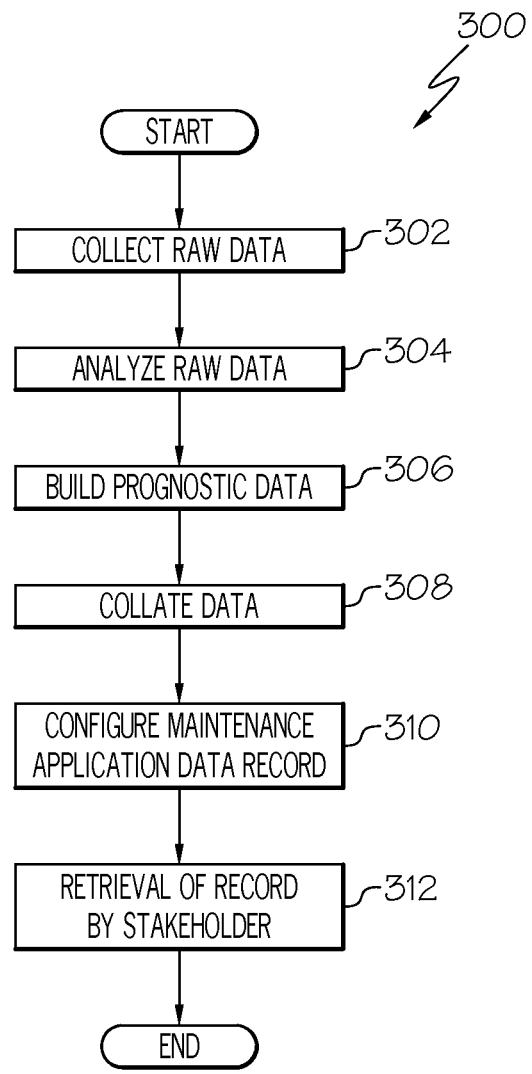
FIG. 3 is a flow chart of a method of preparing aircraft maintenance application data for retrieval via a remote device, in accordance with an exemplary embodiment.

FIG. 3 is a flow chart 300 describing steps of preparing aircraft maintenance application data for retrieval via a remote device, in accordance with an exemplary embodiment. The various steps are exemplary; additional steps may be added, and steps may be arranged in a different order.

When the aircraft is in service, which is defined as including taxi operations, take-off operations, cruise operations, and landing operations, the parametric raw data is collected for various subsystems and LRUs and stored within the CMC memory 204. Raw data may include any of the thousands of available data parameters (representing, for example, onboard instruments and equipment, line replacement units (LRU), altitude, temperature, operating speed, engine thrust, and the like.

The CMC raw data is collected from CMC memory 204 and moved into a first layer 212 for use by the other layers at STEP 302. In STEP 304, the raw data is analyzed. The data analysis step inspects the raw data, and identifies predictive patterns in the raw data. The identified predictive patterns are indicators of a health or performance issue of a subsystem. For simplifying purposes, "subsystem" is defined herein to include one or more of: individual parts, aircraft subsystems, an entire aircraft system, or a line replacement unit (LRU). The identified predictive patterns are used to perform further diagnostics of the existing subsystem(s) issues and to generate an error recovery mechanism for each subsystem issue. In STEP 306, a prognostic data report for the one or more subsystems or LRUs is built. In the exemplary embodiment, STEP 304 and STEP 306 occur in the second layer 214.

In STEP 308, the prognostic data report generated in STEP 306 is collated into maintenance application data records for specific applications that satisfy the requests or interests of specific stakeholders. The exemplary embodiment provides modularization in this manner. Applications that can be built to satisfy the requests or interests of specific stakeholders such as operators, OEMs, suppliers, or end users, include, but are not limited to: fault identification and repair information, for example, to perform cascade effect removal, fault consolidation, fault isolation and/or fault correlation; data loading; fault history; initiated/interactive tests (tests which can be manually initiated or require human interactions or observations), input monitoring; configuration reporting; shop faults; and report generation, for example, to save reports to a disk, or print or send via a data link to a destination).

At STEP 312 a stakeholder retrieves the configured and customized maintenance application data record. The configuration and tuning takes into account native platform needs such as the target system architecture (CPU, memory, etc.), operating system and interfaces, and supports multiple stakeholders, for example, the pilot, OEMs, and suppliers. The exemplary embodiment enables concurrently customizing multiple maintenance application data records that include the stakeholder-relevant aircraft maintenance data.

At STEP 312 the configured and customized maintenance application data record is retrieved by a stakeholder. As described hereinabove, the stakeholder may access the record via a ground line (e.g., ground line 106) or wirelessly (e.g., wireless communication). The stakeholder may be in a remote location and is typically utilizing a portable or mobile device (e.g., portable device 110).

Thus, there has been provided a method and system for preparing aircraft maintenance application data for retrieval by portable devices. The exemplary embodiment is capable of expansion to support future requirements; such expansion may be the type of information made available to the stakeholder and the processing and presentation of the information.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for preparing aircraft maintenance application data in an aircraft with onboard memory, the method comprising:
in a central maintenance computer onboard the aircraft,
collecting raw aircraft maintenance data while the aircraft is in service;
storing the raw aircraft maintenance data in the onboard memory;
analyzing the raw aircraft maintenance data;
building, in the onboard memory, prognostic data consistent with the analyzed raw data;
collating the prognostic data for use in stakeholder-specific maintenance application data records; and
concurrently generating, in the onboard memory, based on the collated prognostic data a plurality of customized stakeholder-specific maintenance application data records, wherein each maintenance application data record is customized based on a respective stakeholder's system architecture.

2. The method of claim 1, wherein the step of analyzing comprises identifying a predictive pattern in the raw aircraft maintenance data that is indicative of a subsystem issue.

3. The method of claim 2, wherein the subsystem is one of a plurality of subsystems and the step of analyzing further comprises identifying a respective predictive pattern for more than one of the subsystems.

4. The method of claim 3, wherein the step of building prognostic data further comprises generating an error recovery mechanism consistent with each predictive pattern.

5. The method of claim 1, further comprising transmitting the collated prognostic data to an application layer of the onboard memory.

6. The method of claim 1, wherein concurrently generating a plurality of customized stakeholder-specific maintenance application data records comprises duplicating at least one prognostic datum.

7. The method of claim 1, wherein concurrently generating a plurality of customized stakeholder-specific maintenance application data records comprises configuring a maintenance application data record consistent with a first stakeholder's requirement.

8. The method of claim 7, wherein the first stakeholder's requirement is one of a plurality of stakeholder's requirements and further comprising configuring each of the plurality of customized stakeholder-specific maintenance application data records consistent with a respective stakeholder's requirement of the plurality of stakeholder's requirements.

9. The method of claim 8, further comprising:
performing the step of collecting in a first layer of onboard memory, the steps of analyzing and building in a second layer of onboard memory, and the step of collating in a third layer of onboard memory; and
storing the plurality of maintenance application data records in an application layer of the onboard memory.

10. A method for preparing onboard maintenance application data records based on aircraft maintenance data collected while an aircraft is in service, the aircraft having onboard memory and a subsystem, the method comprising:
collecting raw aircraft maintenance data;
identifying a predictive pattern in the raw aircraft maintenance data that is indicative of an issue with the aircraft subsystem;
creating an error recovery mechanism according to the predictive pattern;
building a prognostic data report for the aircraft subsystem;
receiving a first stakeholder's requirements comprising (i) a maintenance data request and (ii) system architecture constraints; and
generating the maintenance application data record in the onboard memory, wherein the maintenance application data record is (i) reflective of the prognostic data report, (ii) customized to the requirements of the first stakeholder, and (iii) and configured for remote retrieval by the first stakeholder.

11. The method of claim 10, further comprising retrieving the maintenance application data record by the first stakeholder.

12. The method of claim 10, wherein the first stakeholder is one of a plurality of stakeholders, and further comprising:
receiving, for each stakeholder of the plurality of stakeholders, a unique stakeholder's requirement comprising (i) a maintenance data request and (ii) system architecture constraints;
and
wherein the maintenance application data record is one of a plurality of unique maintenance application data records generated concurrently in the onboard memory, and each maintenance application data record of the plurality of unique maintenance application data records is (i) customized to the requirements of a respective stakeholder, and (iii) and configured for remote retrieval by the respective stakeholder.

13. The method of claim 12, further comprising duplicating at least one prognostic datum within two or more of the plurality of unique maintenance application data records.

14. The method of claim 12, further comprising retrieving, by a second stakeholder, a second stakeholder's maintenance application data record that is different from the first stakeholder's maintenance application data record.

15. A system for preparing for remote retrieval a maintenance application data record collected while an aircraft having a subsystem is in service, the system comprising:
an onboard memory device; and
an onboard processor coupled to the memory device and configured to 1) collect raw aircraft maintenance data; 2) identify a predictive pattern in the raw aircraft maintenance data that is indicative of an issue with the subsystem; 3) generate an error recovery mechanism according to the predictive pattern; 4) build a prognostic data report for the subsystem; 5) receive requirements of a first stakeholder, and 6) generate the maintenance application data record, wherein the maintenance application data record is (i) reflective of the prognostic data report, (ii) customized to the requirements of the first stakeholder, and (iii) and configured for remote retrieval when initiated by the first stakeholder;
wherein the first stakeholder is one of a plurality of stakeholders, and the processor is further configured to receive, for each stakeholder of the plurality of stakeholders, a unique stakeholder's requirement comprising (i) a maintenance data request and (ii) system architecture constraints;

concurrently generate, for each stakeholder of the plurality of stakeholders, a unique maintenance application data record that is (i) customized to requirements of a respective stakeholder, and (ii) and configured for remote retrieval by the respective stakeholder.

16. The system of claim 15, wherein the processor is further configured to transmit the maintenance application data record to the first stakeholder.

17. The system of claim 15, further comprising:

A remote retrieval device coupled to the vehicle for retrieving the first stakeholder's maintenance application data record, the remote retrieval device comprising system architecture constraints consistent with the first stakeholder's requirement.

18. The system of claim 15, wherein the subsystem is one of a plurality of subsystems, and wherein the processor is further configured to build a prognostic data report for each of the subsystems.

* * * * *